(12) United States Patent
Suzuki et al.

(10) Patent No.: US 12,503,214 B2
(45) Date of Patent: Dec. 23, 2025

(54) WATERCRAFT MANEUVERING SYSTEM AND WATERCRAFT INCLUDING THE WATERCRAFT MANEUVERING SYSTEM

(71) Applicant: YAMAHA HATSUDOKI KABUSHIKI KAISHA, Iwata (JP)

(72) Inventors: Yuhei Suzuki, Shizuoka (JP); Ryo Nakanishi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 140 days.

(21) Appl. No.: 18/404,946

(22) Filed: Jan. 5, 2024

(65) Prior Publication Data

US 2024/0239471 A1    Jul. 18, 2024

(30) Foreign Application Priority Data

Jan. 17, 2023    (JP) .................... 2023-005378

(51) Int. Cl.
| | | |
|---|---|---|
| *B63H 25/00* | (2006.01) | |
| *B63B 79/00* | (2020.01) | |
| *B63B 79/10* | (2020.01) | |
| *B63B 79/30* | (2020.01) | |
| *B63B 79/40* | (2020.01) | |
| *B63H 25/04* | (2006.01) | |
| *B63H 25/02* | (2006.01) | |

(52) U.S. Cl.
CPC ............. *B63H 25/04* (2013.01); *B63B 79/10* (2020.01); *B63B 79/30* (2020.01); *B63B 79/40* (2020.01); *B63H 2025/022* (2013.01); *B63H 2025/026* (2013.01)

(58) Field of Classification Search
CPC .............. B63H 25/04; B63H 2025/022; B63H 2025/026; B63B 79/40; B63B 79/30; B63B 79/10
USPC .......................................... 701/21
See application file for complete search history.

(56) References Cited

U.S. PATENT DOCUMENTS

| | | | |
|---|---|---|---|
| 11,987,339 B1 * | 5/2024 | Ikegaya | ................. B63H 25/04 |
| 2006/0110990 A1 | 5/2006 | Yazaki et al. | |
| 2022/0315193 A1 * | 10/2022 | Ikegame | .............. G05D 1/0206 |
| 2022/0388619 A1 * | 12/2022 | Yamaguchi | ............. B63B 79/10 |
| 2023/0406473 A1 * | 12/2023 | Ikegame | ................ B63H 25/04 |

\* cited by examiner

*Primary Examiner* — Tiffany P Young
(74) *Attorney, Agent, or Firm* — Keating & Bennett, LLP

(57) ABSTRACT

A watercraft includes a steering operator to be operated by a user to steer a watercraft, an operation amount sensor to detect an operation amount of the steering operator, a steering device including a steering actuator to change a steering angle, a steering angle sensor to detect the steering angle, and a steering controller configured or programmed to control the steering actuator according to an output signal of the operation amount sensor and an output signal of the steering angle sensor. The steering controller is configured or programmed to monitor the output signal of the steering angle sensor for an abnormality, feedback-control the steering actuator based on the output signal of the steering angle sensor to achieve a target steering angle when the abnormality is not detected, and feedforward-control the steering actuator based on the output signal of the operation amount sensor when the abnormality is detected.

14 Claims, 5 Drawing Sheets

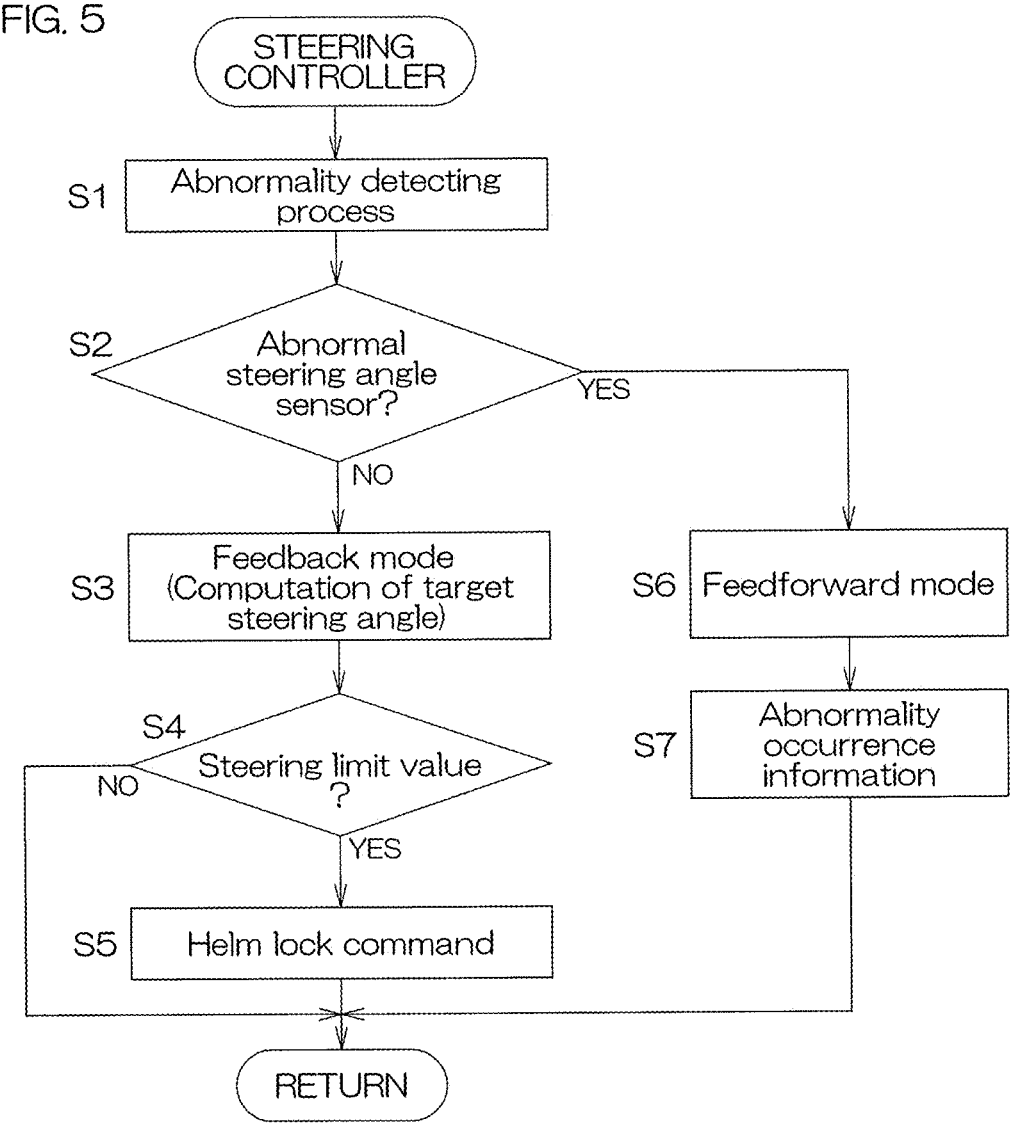

WATERCRAFT MANEUVERING SYSTEM AND WATERCRAFT INCLUDING THE WATERCRAFT MANEUVERING SYSTEM

CROSS REFERENCE TO RELATED APPLICATIONS

This application claims the benefit of priority to Japanese Patent Application No. 2023-005378 filed on Jan. 17, 2023. The entire contents of this application are hereby incorporated herein by reference.

BACKGROUND OF THE INVENTION

1. Field of the Invention

The present invention relates to watercraft maneuvering systems, and watercraft including the watercraft maneuvering systems.

2. Description of the Related Art

US 2006/0110990 A1 discloses a steering device which can continue the steering of an outboard motor even if having trouble with its steering angle sensor that detects the steering angle of the outboard motor. The steering device includes a rotation angle sensor that detects the rotation angle of a steering wheel, the steering angle sensor that detects the steering angle of the outboard motor, and an electronic control unit (ECU) that controls a steering electric motor to steer the outboard motor. The ECU includes a target steering angle setting portion that sets a target steering angle based on the rotation angle detected by the rotation angle sensor, a controller that determines the drive current of the steering electric motor so that the steering angle of the outboard motor approaches the target steering angle, and a feedforward circuit. The engine rotation speed of the outboard motor, the drive current of the steering electric motor, and the steering angle detected by the steering angle sensor are inputted to the feedforward circuit. The feedforward circuit stores the inputted drive current as characteristics with respect to the steering angle and the engine rotation speed. When the steering angle sensor fails, the feedforward circuit estimates the steering angle of the outboard motor based on the drive current and the engine rotation speed, and supplies the estimated steering angle to the controller.

If the steering angle sensor is normal, the controller performs a feedback control to adjust the steering angle detected by the steering angle sensor to the target steering angle. If the steering angle sensor fails, the controller determines the drive current based on the estimated steering angle supplied from the feedforward circuit and the target steering angle such that the steering angle of the outboard motor is adjusted to the target steering angle. That is, if the steering angle sensor fails, the steering angle for the feedback control is replaced with the estimated steering angle to drive the steering electric motor. Therefore, whether the steering angle sensor is normal or abnormal, the feedback control is performed based on the target steering angle and the steering angle.

SUMMARY OF THE INVENTION

The inventors of example embodiments of the present invention described and claimed in the present application conducted an extensive study and research regarding a watercraft maneuvering system, such as the one described above, and in doing so, discovered and first recognized new unique challenges and previously unrecognized possibilities for improvements as described in greater detail below.

In US 2006/0110990 A1, the rotation angle of the steering wheel is detected by the rotation angle sensor, and the target steering angle is set based on the rotation angle.

However, the steering wheel of a watercraft may be configured in some cases to have no operation range limit, i.e., to be limitlessly rotatable. In such a case, a rotation angle sensor capable of detecting the absolute rotation angle of the steering wheel is not provided, but an operation amount sensor that detects the operation amount of the steering wheel may be provided instead. The operation amount sensor may be, for example, an operation speed sensor that detects a change in the operation angle (operation amount) per unit time. The output signal of the operation amount sensor does not represent an absolute rotation angle, so that it is impossible to set the target steering angle based on the output signal of the operation amount sensor. Therefore, the configuration disclosed in US 2006/0110990 A1 cannot be utilized.

Example embodiments of the present invention provide watercraft maneuvering systems each including an operation amount sensor to detect an operation amount of a steering operator, and that are able to maintain a steering function even if the output signal of a steering angle sensor is not available, and watercraft including the watercraft maneuvering systems.

In order to overcome the previously unrecognized and unsolved challenges described above, an example embodiment of the present invention provides a watercraft maneuvering system including a steering operator to be operated by a user to steer a watercraft, an operation amount sensor to detect an operation amount of the steering operator, a steering device including a steering actuator to change a steering angle, a steering angle sensor to detect the steering angle, and a steering controller configured or programmed to control the steering actuator according to an output signal of the operation amount sensor and an output signal of the steering angle sensor. The steering controller is configured or programmed to monitor the output signal of the steering angle sensor for an abnormality, feedback-control the steering actuator based on the output signal of the steering angle sensor to achieve a target steering angle when the abnormality is not detected, and feedforward-control the steering actuator based on the output signal of the operation amount sensor when the abnormality is detected.

With this arrangement, if the output signal of the steering angle sensor is not abnormal, the steering actuator is feedback-controlled based on the output signal of the steering angle sensor to achieve the target steering angle. If the output signal of the steering angle sensor is abnormal, the feedback control cannot be performed. Therefore, when the abnormality is detected in the output signal of the steering angle sensor, the steering actuator is feedforward-controlled based on the output signal of the operation amount sensor without the use of the output signal of the steering angle sensor. Therefore, even when the output signal of the steering angle sensor is abnormal, the steering device can be operated by the steering actuator by operating the steering operator to change the steering angle. Thus, even when the abnormality occurs in the output signal of the steering angle sensor, it is possible to maintain the steering function based on the operation of the steering operator.

It is also possible to provide a manual operation mechanism which permits the manual operation of the steering device, i.e., without the use of the driving force of the steering actuator. In this case, even when the abnormality occurs in the output signal of the steering angle sensor, the steering angle can be changed. In an SBW (steer-by-wire) system having no mechanical connection between the steering operator and the steering device, the steering device is desirably designed to be manually operable for an emergency. However, the manual operation mechanism for an emergency requires a greater effort as compared with the operation of the steering operator in a normal state. With the arrangement according to the example embodiment described above, in contrast, the steering function is maintained by utilizing the power of the steering actuator controlled according to the operation of the steering operator even when the abnormality occurs in the output signal of the steering angle sensor. Thus, the watercraft can be steered with a smaller effort than by utilizing the manual operation mechanism.

In an example embodiment of the present invention, the operation amount sensor detects the operation speed of the steering operator (an operation amount per unit time).

In an example embodiment of the present invention, the steering controller is configured or programmed to compute the target steering angle based on the output signal of the steering angle sensor and the output signal of the operation amount sensor, and to stop computing the target steering angle when the abnormality is detected.

With this arrangement, if no abnormality is detected in the output signal of the steering angle sensor, the steering controller computes the target steering angle based on the output signal of the steering angle sensor and the output signal of the operation amount sensor. Therefore, the steering actuator can be feedback-controlled by utilizing the target steering angle computed according to the operation of the steering operator. Thus, the steering device can be actuated according to the operation of the steering operator to change the steering angle. When the abnormality is detected in the output signal of the steering angle sensor, computing the target steering angle is stopped, and the feedforward-control utilizing the output signal of the operation amount sensor is enabled. Thus, the steering function based on the operation of the steering operator is maintained.

The target steering angle may be externally commanded to the steering controller. Where the target steering angle is externally commanded, the steering controller may feedback-control the steering actuator without the use of the target steering angle based on the output signal of the operation amount sensor but with the use of the target steering angle externally commanded. Where the watercraft maneuvering system includes a plurality of control modes, the steering controller preferably selects either the internally computed target steering angle or the externally commanded target steering angle depending on its control mode. Further, the steering controller may stop computing the target steering angle based on the output signal of the operation amount sensor in a control mode in which the target steering angle is externally commanded.

In an example embodiment of the present invention, the steering operator includes a steering wheel having no operation range limit (having a limitless rotation operation range).

With this arrangement, even when the output signal of the steering angle sensor is abnormal, the steering device can be actuated by feedforward-controlling the steering actuator based on the operation of the steering wheel. Therefore, the steering function based on the operation of the steering wheel is maintained.

In the SBW system having no mechanical connection between the steering wheel and the steering device, the steering wheel can be designed so as to have a limitless rotation operation range with no operation range limit. Thus, a rotational position of the steering wheel observed when the watercraft maneuvering system starts operating can be defined as an initial position to start the control operation. In this case, the absolute rotational position of the steering wheel is substantially meaningless, but the operation amount of the steering wheel from the initial position or the operation amount of the steering wheel per unit time (i.e., an operation speed) is meaningful. Therefore, a sensor that detects the absolute rotational position of the steering wheel is not used, but the operation amount sensor that detects the operation amount of the steering wheel is used. Thus, the steering function based on the operation of the steering wheel can be maintained with the use of the operation amount sensor even when the abnormality occurs in the output signal of the steering angle sensor.

In an example embodiment of the present invention, the watercraft maneuvering system further includes a rotation restrictor (specifically, a brake) to restrict the rotation of the steering wheel, and a helm controller configured or programmed to control the rotation restrictor. The steering controller is configured or programmed to transmit steering angle information about the steering angle of the steering device to the helm controller when the abnormality does not occur. The helm controller is configured or programmed to actuate the rotation restrictor to restrict the rotation of the steering wheel when the steering angle of the steering device corresponds to a steering limit as indicated by the steering angle information.

The steering angle information may be information indicating whether or not the steering angle of the steering device has a value corresponding to the steering limit. Where the target steering angle or the steering angle detected by the steering angle sensor has the value corresponding to the steering limit of the steering device, for example, the steering controller may apply steering angle information indicating this to the helm controller. The steering angle information may be an actuation command (helm lock command) indicating that the rotation restrictor is to be actuated.

The steering angle information may be information indicating the value of the target steering angle or the steering angle detected by the steering angle sensor. In this case, the helm controller may actuate the rotation restrictor when the steering angle information indicates the value corresponding to the steering limit of the steering device.

With the aforementioned arrangement, if the output signal of the steering angle sensor is not abnormal, the rotation restrictor is actuated to restrict the rotation of the steering wheel when the steering angle of the steering device reaches the steering limit. Thus, the user (operator) of the steering wheel can recognize, through tactile feedback from the steering wheel, that the steering angle reaches the steering limit. If the output signal of the steering angle sensor is abnormal, the steering limit cannot be properly detected and, therefore, the steering controller does not transmit the steering angle information to the helm controller. In this case, the rotation restrictor cannot be actuated, but the steering function based on the operation of the steering wheel can be maintained.

In an example embodiment of the present invention, the helm controller is configured or programmed not to actuate the rotation restrictor but to permit the limitless rotation of the steering wheel when the abnormality occurs.

With this arrangement, when the abnormality occurs in the output signal of the steering angle sensor, the rotation restrictor does not restrict the rotation of the steering wheel and, therefore, the steering function based on the operation of the steering wheel can be maintained.

The helm controller may be configured or programmed to stop controlling the rotation restrictor upon reception of information about the occurrence of the abnormality to permit the limitless rotation of the steering wheel.

Further, the helm controller controls the rotation restrictor based on the steering angle information from the steering controller. Therefore, the helm controller may be configured or programmed not to actuate the rotation restrictor if the steering angle information is not applied. When the abnormality is detected, the steering controller does not supply the steering angle information to the helm controller. As a result, the helm controller does not actuate the rotation restrictor but permits the limitless rotation of the steering wheel when the abnormality occurs.

In an example embodiment of the present invention, the watercraft maneuvering system further includes a main controller configured or programmed to generate the target steering angle and supply the target steering angle to the steering controller in a watercraft maneuvering mode which is not based on the operation of the steering wheel. The main controller is configured or programmed to switch a control mode to an ordinary watercraft maneuvering mode which is based on the operation of the steering wheel upon reception of information about the abnormality from the steering controller, and stop the generation of the target steering angle.

With this arrangement, the information about the detection of the abnormality of the steering angle sensor is shared with the main controller. Thus, the main controller can properly switch its control mode, generate the target steering angle, and stop the generation of the target steering angle depending on whether or not the abnormality occurs in the output signal of the steering angle sensor. Particularly, when the abnormality occurs in the output signal of the steering angle sensor in the watercraft maneuvering mode which is not based on the operation of the steering wheel, the control mode is automatically switched to the ordinary watercraft maneuvering mode in which the watercraft maneuvering operation is performed by operating the steering wheel. Thus, the user can thereafter perform the watercraft maneuvering operation by operating the steering wheel.

The information about the occurrence of the abnormality in the output signal of the steering angle sensor is preferably provided to the user by a proper notification device. Thus, the user can recognize the occurrence of the abnormality, and can start performing the watercraft maneuvering operation by operating the steering wheel.

In an example embodiment of the present invention, the watercraft maneuvering mode which is not based on the operation of the steering wheel includes at least one of an automatic watercraft maneuvering mode and a joystick mode in which the main controller generates the target steering angle in response to the operation of a joystick.

With this arrangement, when the abnormality occurs in the output signal of the steering angle sensor in the watercraft maneuvering mode such as the joystick mode, the control mode is automatically switched to the ordinary watercraft maneuvering mode. Thus, the user can smoothly shift to the steering operation based on the operation of the steering wheel.

In an example embodiment of the present invention, the steering controller is configured or programmed to control the steering actuator so as to change the steering angle of the steering device according to the operation amount detected by the operation amount sensor in the feedforward-control.

With this arrangement, the steering actuator can be feedforward-controlled to be actuated to change the steering angle according to the operation amount of the steering operator.

In an example embodiment of the present invention, the steering actuator includes a hydraulic actuator including a hydraulic cylinder and an electric pump to supply a hydraulic oil to the hydraulic cylinder.

Alternatively, the steering actuator may be configured to include an electric motor, and a ball screw mechanism driven by the electric motor.

In an example embodiment of the present invention, the steering device steers an outboard motor attached to a hull.

With this arrangement, even when the abnormality occurs in the output signal of the steering angle sensor in the watercraft maneuvering system adapted to steer the outboard motor, the steering function based on the operation of the steering operator can be maintained.

Another example embodiment of the present invention provides a watercraft maneuvering system including a steering operator to be operated by a user to steer a watercraft, an operation amount sensor to detect an operation amount of the steering operator, a steering device including a steering actuator to change a steering angle, a steering angle sensor to detect the steering angle, and a steering controller configured or programmed to control the steering actuator according to an output signal of the operation amount sensor and an output signal of the steering angle sensor. The steering controller is configured or programmed to include a feedback mode in which the steering actuator is feedback-controlled to achieve a target steering angle based on the output signal of the steering angle sensor, and a feedforward mode in which the steering actuator is feedforward-controlled based on the output signal of the operation amount sensor.

With this arrangement, even when the output signal of the steering angle sensor is not available, the steering actuator can be actuated through the feedforward-control based on the output signal of the operation amount sensor to change the steering angle of the steering device. Thus, the steering function based on the operation of the steering operator can be maintained.

Another further example embodiment of the present invention provides a watercraft including a hull and a watercraft maneuvering system provided on the hull and including any of the aforementioned features.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5 is a flowchart for describing an exemplary process to be performed by the steering controller.

DETAILED DESCRIPTION OF THE EXAMPLE EMBODIMENTS

Figure 1:
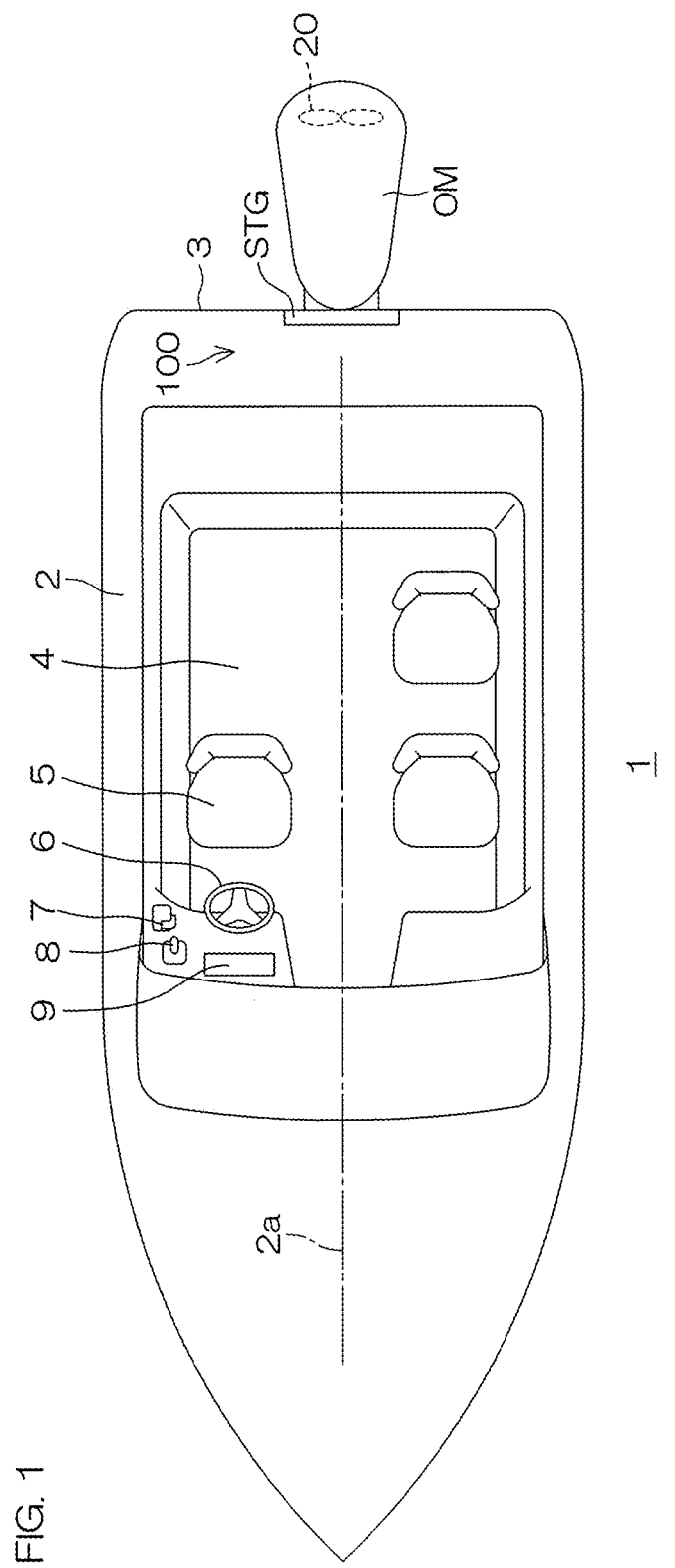
FIG. 1 is a plan view showing an exemplary construction of a watercraft mounted with a watercraft maneuvering system according to an example embodiment of the present invention.

FIG. 1 is a plan view showing an exemplary construction of a watercraft 1 mounted with a watercraft maneuvering system 100 according to an example embodiment of the present invention. The watercraft 1 includes a hull 2 and an outboard motor OM as an exemplary propulsion device. The outboard motor OM is attached to the stern 3 of the hull 2. A steering device STG is provided on the stern 3 to steer the outboard motor OM leftward and rightward. The steering device STG changes the direction of a propulsive force generated by the outboard motor OM leftward and rightward. The steering device STG pivots (turns) the body of the outboard motor OM leftward and rightward with respect to the hull 2 such that the steering angle of the outboard motor OM is changed to change the course of the watercraft 1. In this example embodiment, the steering angle is defined as the angle of the propulsive force of the outboard motor OM with respect to the anteroposterior direction of the hull 2. That is, the steering angle is an angle defined between the direction of the propulsive force of the outboard motor OM and a center line 2a extending anteroposteriorly of the hull 2 as seen in a plan view.

A usable space 4 for passengers is provided inside the hull 2. A helm seat 5 is provided in the usable space 4. A steering wheel 6, a remote control lever 7, a joystick 8, a gauge 9 (display panel) and the like are provided in association with the helm seat 5. The steering wheel 6 is an example of the steering operator to be operated by a user (operator) to change the course of the watercraft 1. The remote control lever 7 is an operator to be operated by the user to change the magnitude (output) and the direction (forward or reverse direction) of the propulsive force of the outboard motor OM, and corresponds to an acceleration operator. The joystick 8 is an operator to be operated instead of the steering wheel 6 and the remote control lever 7 by the user to maneuver the watercraft. The joystick 8 is another example of the steering operator. The gauge 9 is a display device on which information for the watercraft maneuvering is displayed, and is an example of the notification device.

Figure 2:
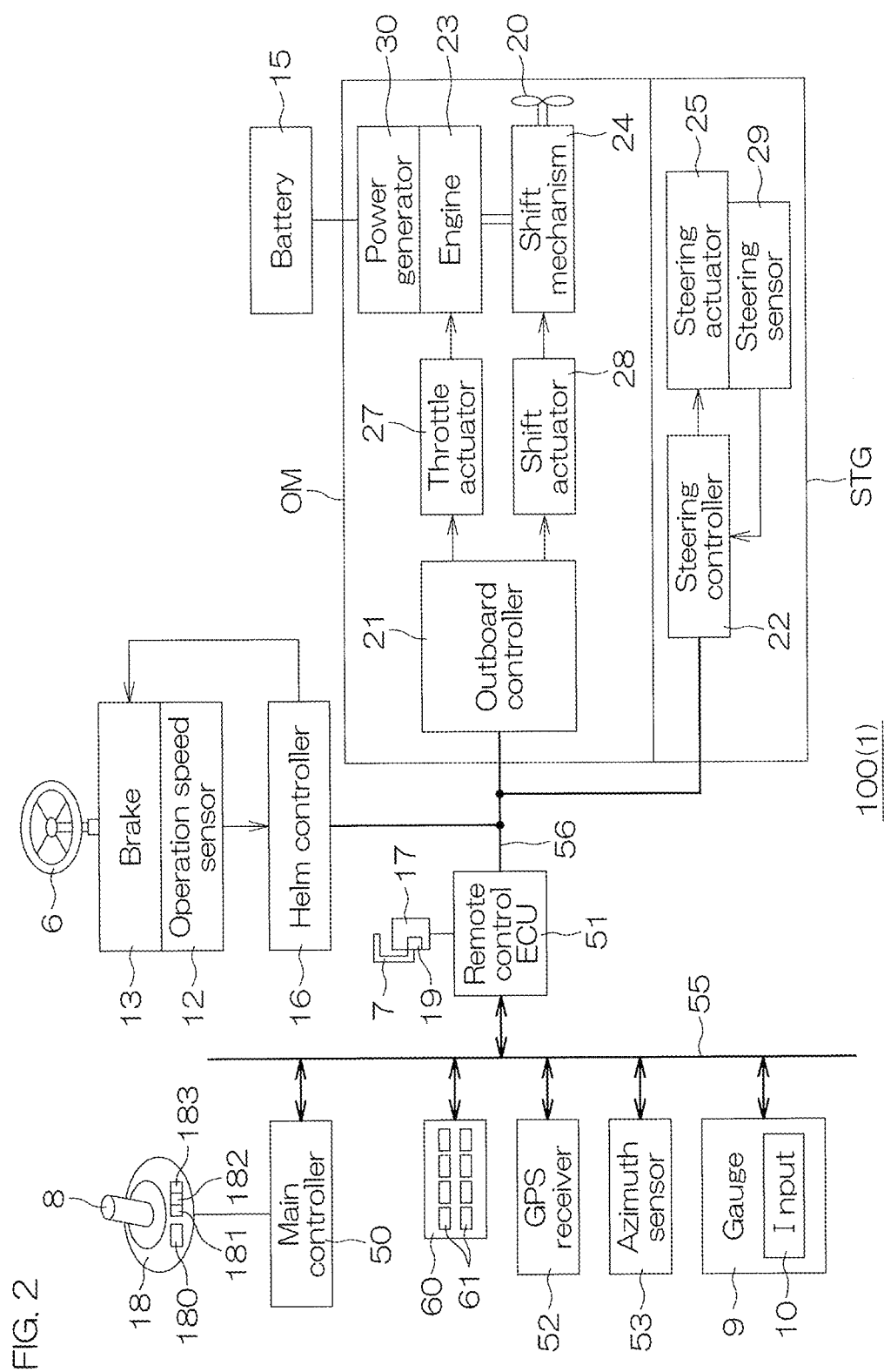
FIG. 2 is a diagram showing the configuration of the watercraft maneuvering system by way of example.

FIG. 2 is a diagram showing the configuration of the watercraft maneuvering system 100 provided in the watercraft 1 by way of example.

The outboard motor OM may be an engine outboard motor or an electric outboard motor. In FIG. 2, the outboard motor OM is illustrated as the engine outboard motor by way of example. The outboard motor OM includes an outboard motor controller (electronic control unit) 21, an engine 23, a shift mechanism 24, a propeller 20, a power generator 30 and the like. The power generator 30 is driven by the engine 23. The power generator 30 supplies electric power to the electric components of the outboard motor OM, and charges a battery 15 provided on the hull 2 (see FIG. 1).

Power generated by the engine 23 is transmitted to the propeller 20 via the shift mechanism 24. The shift mechanism 24 is configured to select a shift position from a forward shift position, a reverse shift position, and a neutral shift position. With the shift position set to the forward shift position, the propeller 20 is rotated in a forward rotation direction by the transmission of the rotation of the engine 23 such that the outboard motor OM is brought into a forward drive state to generate a forward propulsive force. With the shift position set to the reverse shift position, the propeller 20 is rotated in a reverse rotation direction by the transmission of the rotation of the engine 23 such that the outboard motor OM is brought into a reverse drive state to generate a reverse propulsive force. With the shift position set to the neutral shift position, the power transmission between the engine 23 and the propeller 20 is interrupted such that the outboard motor OM is brought into an idling state.

The outboard motor OM further includes a throttle actuator 27 and a shift actuator 28, which are controlled by the outboard motor controller 21. The throttle actuator 27 is an electric actuator (typically including an electric motor) that actuates the throttle valve (not shown) of the engine 23. The shift actuator 28 is an actuator (typically including an electric motor) that actuates the shift mechanism 24.

The steering device STG includes a steering controller 22 and a steering actuator 25. The steering controller 22 drives the steering actuator 25. The steering actuator 25 is a drive source of the steering device STG, and typically includes an electric motor. The steering actuator 25 may include a ball screw mechanism to be driven by the electric motor. Alternatively, the steering actuator 25 may be a hydraulic actuator including a hydraulic cylinder to which a hydraulic oil is supplied by a pump (electric pump) driven by the electric motor.

In this example embodiment, the steering device STG is configured as a separate unit from the outboard motor OM, and attached to the stern 3. However, the steering device STG may be unified with the outboard motor OM, and may be incorporated in the outboard motor OM. Further, a portion (e.g., the steering controller 22) of the steering device STG may be incorporated in the body of the outboard motor OM. A steering angle sensor 29 to detect the steering angle is incorporated in the steering device STG. The steering angle sensor 29 may be a position sensor to detect the position of a movable portion of the steering actuator 25. Alternatively, the steering angle sensor 29 may be a position sensor to detect the position of a movable portion of a link mechanism (not shown) that transmits the drive force of the steering actuator 25 to the outboard motor OM. Thus, the steering angle sensor 29 outputs a signal indicating the steering angle of the outboard motor OM. The position sensor may be a noncontact magnetic sensor including a Hall element and a magnet, for example.

The steering wheel 6 is configured to be rotatable about its rotation axis. The steering wheel 6 is a steering operator having a limitless rotation operation range with no operation range limits. An operation speed sensor 12 to detect the speed of the rotation operation (operation speed) is provided in association with the steering wheel 6. The operation speed sensor 12 is an example of the operation amount sensor to detect the operation amount of the steering wheel 6. The operation speed sensor 12 detects an operation amount per unit time as the operation speed, and generates a signal indicating the operation speed. The output signal of the operation speed sensor 12 is inputted to a helm controller 16. In association with the rotation shaft of the steering wheel 6, a brake 13 (typically, an electromagnetic brake) is provided as the rotation restrictor to restrict the rotation of the steering wheel 6. The brake 13 is controlled by the helm controller 16 to restrict the rotation of the rotation shaft of the steering wheel 6 to restrict the rotation of the steering wheel 6.

As described above, the steering wheel 6 has the limitless rotation operation range, and is limitlessly rotatable leftward and rightward. On the other hand, the steering range of the outboard motor OM has mechanical limitation, i.e., has a right steering limit and a left steering limit. Therefore, when the steering angle of the outboard motor OM corresponds to the right steering limit or the left steering limit, the helm controller 16 actuates the brake 13 to restrict the rotation of the steering wheel 6. Thus, the user who operates the steering wheel 6 can recognize, through tactile feedback from the steering wheel 6, that the steering angle of the outboard motor OM reaches either of the steering limits. The right steering limit and the left steering limit of the steering range of the outboard motor OM to be steered by the steering device STG are often set inward of the mechanical steering limits of the outboard motor OM (closer to a neutral steering angle position).

The remote control lever 7 is pivotally provided to a remote control unit 17. The remote control unit 17 includes an operation position sensor 19 to detect the operation position of the remote control lever 7. The output signal of the operation position sensor 19 is inputted to a remote control ECU (Electronic Control Unit) 51.

The outboard motor controller 21 and the steering controller 22 are connected to an outboard motor control network 56. Further, the helm controller 16 and the remote control ECU 51 are connected to the outboard motor control network 56.

The helm controller 16 applies the operation speed detected by the operation speed sensor 12 to the steering controller 22 via the outboard motor control network 56. The steering controller 22 controls the steering actuator 25 according to the operation speed applied from the helm controller 16. The steering controller 22 may output the steering angle of the outboard motor OM detected by the steering angle sensor 29 or a target steering angle (to be described below) to the outboard motor control network 56. The steering controller 22 may apply a helm lock command to the helm controller 16 when the steering angle of the outboard motor OM reaches either of the steering limits. Upon reception of the helm lock command from the steering controller 22, the helm controller 16 actuates the brake 13 to restrict the rotation of the steering wheel 6.

The steering controller 22 may apply the helm lock command to the helm controller 16, for example, when the target steering angle (to be described later) has a value corresponding to either of the steering limits. Further, the steering controller 22 may apply the helm lock command to the helm controller 16 when the steering angle (actual steering angle) detected by the steering angle sensor 29 has the value corresponding to either of the steering limits. The helm lock command is an example of the steering angle information indicating that the steering angle of the outboard motor OM corresponds to the steering limit.

Instead of the steering controller 22 outputting the helm lock command, the helm controller 16 may actuate the brake 13 according to the target steering angle or the actual steering angle appearing on the outboard motor control network 56. That is, the helm controller 16 may be configured to actuate the brake 13 to restrict the rotation of the steering wheel 6 when the target steering angle or the actual steering angle has the value corresponding to either of the steering limits.

The remote control ECU 51 generates a propulsive force command according to the position of the remote control lever 7 detected by the operation position sensor 19, and supplies the propulsive force command to the outboard motor controller 21 via the outboard motor control network 56. The propulsive force command includes a shift command and an output command. The outboard motor controller 21 controls the shift actuator 28 based on the shift command to control the shift position of the shift mechanism 24. The outboard motor controller 21 controls the throttle actuator 27 based on the output command to control the output (rotation speed) of the engine 23.

A main controller 50 is connected to the remote control ECU 51 via an onboard network 55 (CAN: Control Area Network). A joystick unit 18 is connected to the main controller 50. The joystick unit 18 includes the joystick 8, which can be inclined forward, backward, leftward, and rightward (i.e., in all 360-degree directions) and can be pivoted (twisted) about its axis. Though not shown, the joystick unit 18 includes an inclination sensor to detect the inclination operation direction and the inclination operation amount of the joystick 8, and a pivot sensor to detect the pivot operation direction and the pivot operation amount of the joystick 8. The inclination sensor includes an anteroposterior component sensor to detect the anteroposterior inclination component of the joystick 8, and a lateral component sensor to detect the lateral inclination component of the joystick 8. The detection values of the inclination sensor and the pivot sensor are inputted to the main controller 50.

In this example, the joystick unit 18 further includes a plurality of operation buttons. The operation buttons include a joystick button 180, and holding mode setting buttons 181 to 183. The joystick button 180 is an operator to be operated by the user to select a control mode (watercraft maneuvering mode) utilizing the joystick 8, i.e., a joystick mode. The holding mode setting buttons 181 to 183 are operation buttons to be operated by the user to select position/azimuth holding control modes (examples of the automatic watercraft maneuvering mode). More specifically, the holding mode setting button 181 is operated to select a fixed point holding mode (Stay Point™) in which the position and the bow azimuth (or the stern azimuth) of the watercraft are maintained. The holding mode setting button 182 is operated to select a position holding mode (Fish Point™) in which the position of the watercraft is maintained but the bow azimuth (or the stern azimuth) of the watercraft is not maintained. The holding mode setting button 183 is operated to select an azimuth holding mode (Drift Point™) in which the bow azimuth (or the stern azimuth) of the watercraft is maintained but the position of the watercraft is not maintained.

Further, a GPS (Global Positioning System) receiver 52, an azimuth sensor 53, an application switch panel 60 and the like are connected to the onboard network 55. The GPS receiver 52 is an exemplary position detecting device. The GPS receiver 52 detects the position of the watercraft 1 by receiving radio waves from an artificial satellite orbiting the earth, and outputs position data indicating the position of the watercraft 1 and speed data indicating the moving speed of the watercraft 1. The main controller 50 acquires the position data and the speed data, which are used to control and display the position and/or the azimuth of the watercraft 1. The GPS is a specific example of a GNSS (Global Navigation Satellite System). The azimuth sensor 53 detects the azimuth of the watercraft 1, and generates azimuth data, which is used by the main controller 50.

The application switch panel 60 includes a plurality of function switches 61 to be operated to apply predefined function commands. For example, the function switches 61 may include switches to perform automatic watercraft maneuvering commands. More specifically, a command for a bow holding mode (Heading Hold) in which an automatic steering operation is performed to maintain the bow azimuth during forward sailing may be assigned to one of the function switches 61, and a command for a straight sailing holding mode (Course Hold) in which an automatic steering operation is performed to maintain the bow azimuth and a straight course during forward sailing may be assigned to another of the function switches 61. Further, a command for a checkpoint following mode (Track Point) in which an automatic steering operation is performed to follow a course (route) passing through specified checkpoints may be assigned to further another of the function switches 61, and a command for a pattern sailing mode (Pattern Steer) in which an automatic steering operation is performed to follow a predetermined sailing pattern (zig-zag pattern, spiral pattern or the like) may be assigned to still another of the function switches 6. These modes are examples of the automatic watercraft maneuvering mode.

Further, the gauge 9 is connected to the onboard network 55. The gauge 9 is a display device to display various information for maneuvering the watercraft. The gauge 9 can communicate, for example, with the main controller 50, the remote control ECU 51 and the like. Thus, the gauge 9 can display the operation state of the outboard motor OM, the position and/or the azimuth of the watercraft 1 and other information. The gauge 9 may include an input device 10 such as a touch panel and buttons. The input device 10 may be operated by the user to set various settings and provide various commands such that operation signals are outputted to the onboard network 55. An additional network other than the onboard network 55 may be provided to transmit display control signals related to the gauge 9.

The main controller 50 includes a processor and a memory (both not shown), and is configured or programmed so that the processor executes a program stored in the memory to perform a plurality of functions. The main controller 50 includes a plurality of control modes. The control modes of the main controller 50 are classified into an ordinary watercraft maneuvering mode, the joystick mode, or the automatic watercraft maneuvering mode in terms of the operation system.

The ordinary watercraft maneuvering mode is a control mode in which a steering control operation is performed according to the operation of the steering wheel 6 and a propulsive force control operation is performed according to the operation of the remote control lever 7. In this example embodiment, the ordinary watercraft maneuvering mode is a default control mode of the main controller 50. In the steering control operation, specifically, the steering controller 22 drives the steering actuator 25 according to an operation speed signal generated by the operation speed sensor 12 according to the operation of the steering wheel 6 or a steering angle command (specifically, a target steering angle command) generated by the remote control ECU 51. Thus, the outboard motor OM is steered leftward and rightward to change the direction of the propulsive force to be applied to the hull 2 leftward and rightward. In the propulsive force control operation, specifically, the outboard motor controller 21 drives the shift actuator 28 and the throttle actuator 27 according to the propulsive force command (the shift command and the output command) applied to the outboard motor controller 21 by the remote control ECU 51. Thus, the shift position of the outboard motor OM is set to the forward shift position, the reverse shift position, or the neutral shift position, and the engine output (specifically, the engine rotation speed) is changed.

The joystick mode is a control mode in which the steering control operation and the propulsive force control operation are performed according to the operation signal of the joystick 8. In the joystick mode, the steering control operation and the propulsive force control operation are performed according to the operation of the joystick 8. That is, the main controller 50 applies the steering angle command and the propulsive force command to the remote control ECU 51 according to the operation of the joystick 8. The remote control ECU 51 applies the steering angle command to the steering controller 22, and applies the propulsive force command to the outboard motor controller 21.

The automatic watercraft maneuvering mode is a control mode in which the steering control operation and/or the propulsive force control operation are automatically performed by the functions of the main controller 50 and the like without the operation of the steering wheel 6, the remote control lever 7, and the joystick 8. That is, an automatic watercraft maneuvering operation is performed. The automatic watercraft maneuvering operation includes an automatic watercraft maneuvering operation to be performed during sailing, and an automatic watercraft maneuvering operation to be performed on a position/azimuth holding basis to maintain one or both of the position and the azimuth. Examples of the automatic watercraft maneuvering operation during sailing include the automatic steering operations to be selected by operating the function switches 61. Examples of the automatic watercraft maneuvering operation on the position/azimuth holding basis include watercraft maneuvering operations to be performed in the fixed point holding mode, the position holding mode, and the azimuth holding mode which are respectively selected by operating the holding mode setting buttons 181, 182 and 183. In the automatic watercraft maneuvering mode, the main controller 50 generates the steering angle command and the propulsive force command by utilizing the position information generated by the GPS receiver 52 and/or the azimuth information generated by the azimuth sensor 53. In the automatic watercraft maneuvering mode, the main controller 50 applies the steering angle command and the propulsive force command to the remote control ECU 51, and the remote control ECU 51 applies the steering angle command to the steering controller 22 and applies the propulsive force command to the outboard motor controller 21 as in the joystick mode.

In the joystick mode and the automatic watercraft maneuvering mode, the helm controller 16 does not need to supply the output of the operation speed sensor 12 to the outboard motor control network 56. Alternatively, the steering controller 22 may be programmed so as not to respond to the operation speed signal outputted to the outboard motor control network 56 by the helm controller 16 when the steering angle command is applied from the remote control ECU 51.

Figure 3:
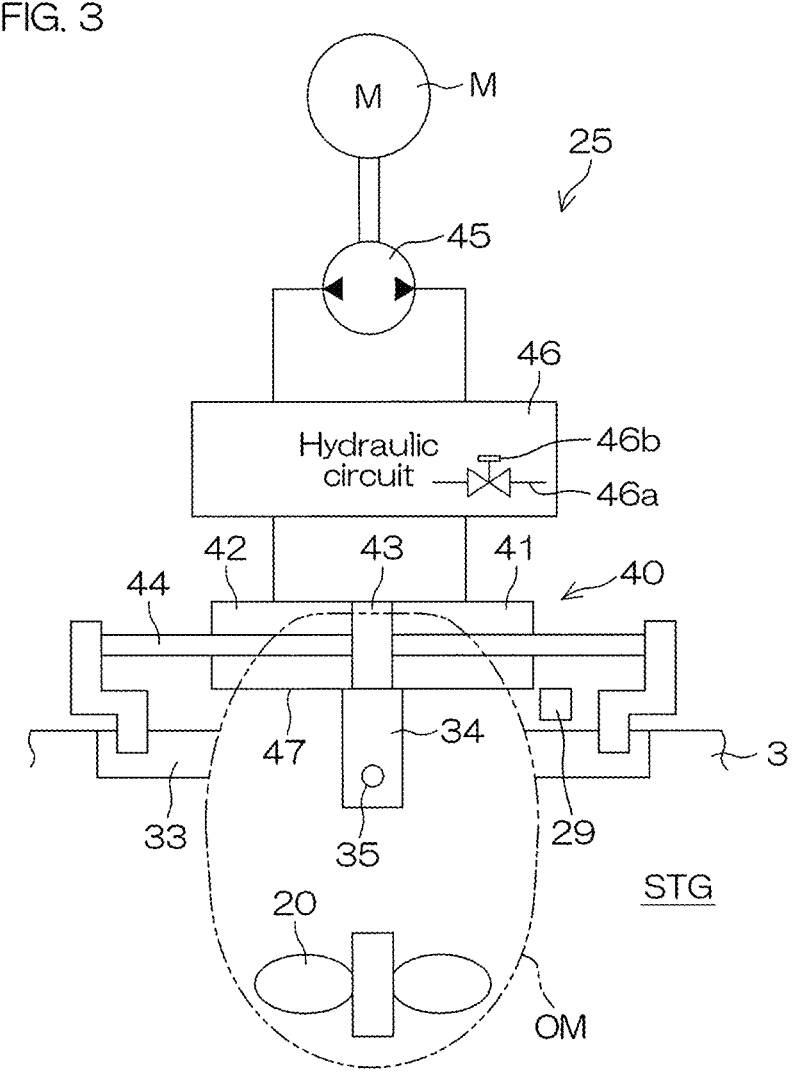
FIG. 3 is a diagram showing the structure of a steering device by way of example.

FIG. 3 is a diagram showing the structure of the steering device STG by way of example. In this example, the steering device STG is a hydraulic steering device. The steering device STG includes a hydraulic pump 45, an electric motor M to drive the hydraulic pump 45, a hydraulic cylinder 40, and a hydraulic circuit 46 to cause a hydraulic oil to flow between the hydraulic pump 45 and the hydraulic cylinder 40. The hydraulic cylinder 40 is a dual action cylinder, and includes a cylinder tube 47, a piston 43 provided in the cylinder tube 47, and a piston rod 44 fixed to the piston 43 and extending to opposite sides of the piston 43.

The cylinder tube 47 and the piston rod 44 each extend laterally. The opposite end portions of the piston rod 44 are connected to the swivel bracket 33 of the outboard motor OM. The inside space of the cylinder tube 47 is partitioned into a right cylinder chamber 41 and a left cylinder chamber 42 by the piston 43. The cylinder tube 47 is linked to the steering arm 34 of the outboard motor OM. The cylinder tube 47 is guided by the piston rod 44 to be movable leftward and rightward. Thus, the steering arm 34 of the outboard motor OM is moved leftward and rightward to pivot (steer) the outboard motor OM about its steering shaft 35 leftward and rightward.

The hydraulic circuit 46 is connected to the right cylinder chamber 41 and the left cylinder chamber 42. The electric motor M is configured to be rotatable in normal and reverse rotation directions, and the hydraulic pump 45 pumps the hydraulic oil into one of the two cylinder chambers 41, 42 according to the rotation direction of the electric motor M. Thus, the cylinder tube is moved leftward or rightward so that the one cylinder chamber has a greater volume and the other cylinder chamber has a smaller volume.

The electric motor M and the hydraulic pump 45 define the electric pump. Further, the steering actuator 25 includes the hydraulic actuator defined by the electric motor M, the hydraulic pump 45, the hydraulic circuit 46, and the hydraulic cylinder 40. The steering angle sensor 29 may be adapted to detect the lateral position of the cylinder tube 47. Alternatively, the steering angle sensor 29 may be adapted to detect the rotational position of the steering arm 34. Thus, the steering angle sensor 29 detects the steering angle of the outboard motor OM.

A bypass oil channel 46a through which the left and right cylinder chambers 41, 42 communicate with each other, and a relief valve 46b that opens and closes the bypass oil channel 46a are preferably provided in the hydraulic circuit 46. By manually opening the relief valve 46b, the left and right cylinder chambers 41, 42 communicate with each other through the bypass oil channel 46a. Therefore, the user can manually steer the outboard motor OM leftward and rightward by applying an external force to the outboard motor OM. By manually closing the relief valve 46b, the user can maintain the outboard motor OM at a desired steering angle. Thus, the manual operation mechanism for an emergency can be provided by the relief valve 46b and the like.

Figure 4:
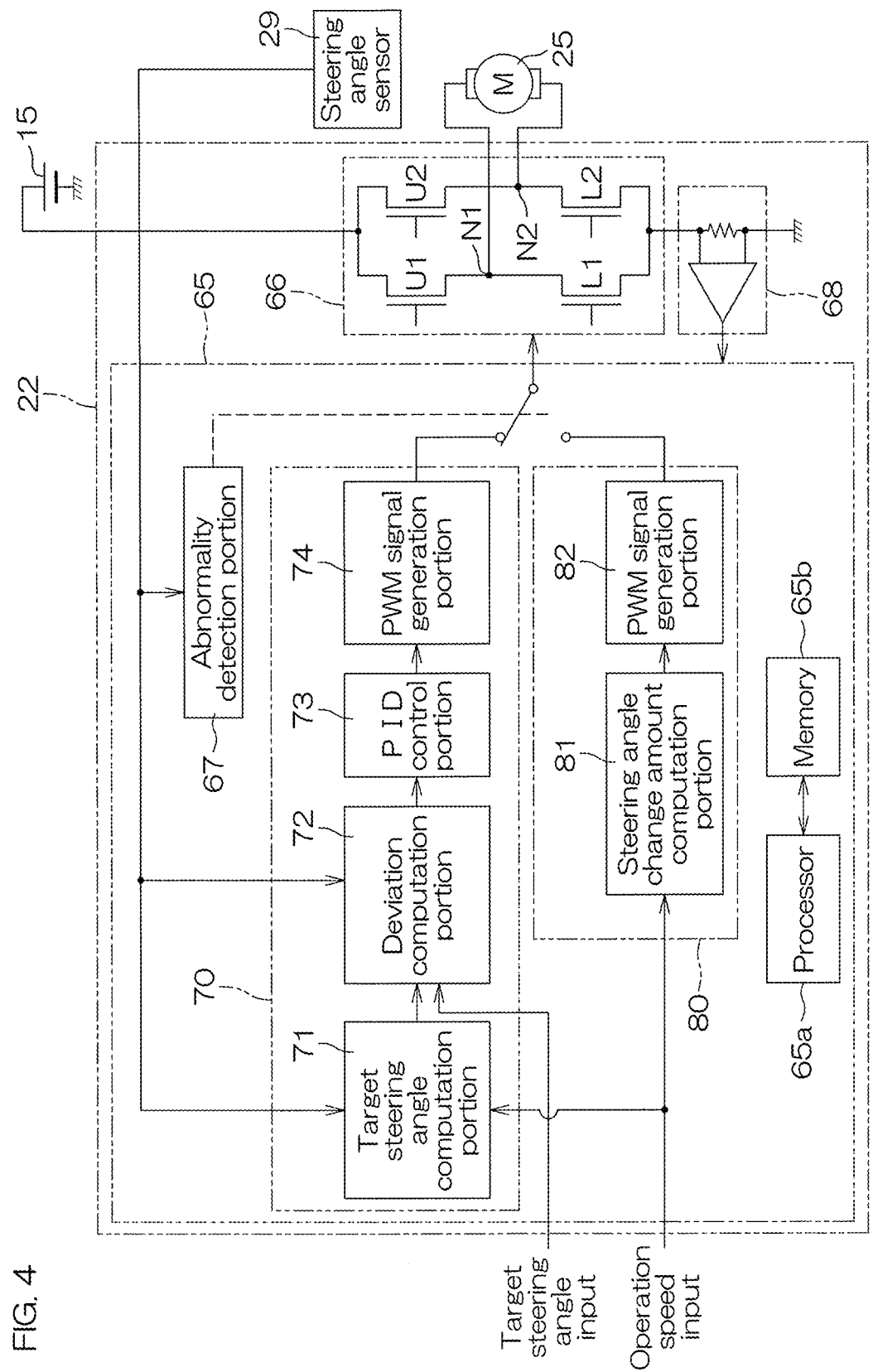
FIG. 4 is a block diagram showing the configuration of a steering controller by way of example.

FIG. 4 is a block diagram showing the configuration of the steering controller 22 by way of example. The steering controller 22 includes a processing unit 65 and a drive circuit 66. The processing unit 65 includes a processor 65a and a memory 65b. The processing unit 65 is configured or programmed so that the processor 65a executes a program stored in the memory 65b to perform a plurality of functions. Specifically, the processing unit 65 is programmed to function as an abnormality detection portion 67, a feedback control portion 70, a feedforward control portion 80 and the like.

The abnormality detection portion 67 performs an abnormality monitoring process to monitor the output signal of the steering angle sensor 29 for an abnormality. By detecting abnormal values of the output signal of the steering angle sensor 29, an abnormality of the steering angle sensor 29 and an abnormality of wirings associated with the steering angle sensor 29 can be detected. The abnormality of the steering angle sensor 29 includes not only the abnormality of the steering angle sensor 29 per se but also the detachment of the steering angle sensor 29 from a predetermined attachment position. Typical examples of the abnormality of the wirings include breakage, short circuiting, and the like of the wirings. These abnormalities are detected by monitoring the output signal of the steering angle sensor 29. Specifically, where the output signal of the steering angle sensor 29 has a value falling outside a predetermined range, there is a possibility that an abnormality occurs in the steering angle sensor 29 per se or the abnormality occurs in the wirings. Further, where the output signal of the steering angle sensor 29 does not change even with a steering actuator driving control signal generated to drive the steering actuator 25, there is a possibility that the steering angle sensor 29 is detached from the predetermined attachment position.

The feedback control portion 70 feedback-controls the steering actuator 25 (more specifically, the electric motor M) based on the output signal of the steering angle sensor 29 so as to achieve the target steering angle. The feedforward control portion 80 feedforward-controls the steering actuator 25 (more specifically, the electric motor M) based on the output signal (operation speed signal) of the operation speed sensor 12. When the abnormality detection portion 67 does not detect the abnormality of the output signal of the steering angle sensor 29, the feedback control portion 70 is enabled. When the abnormality detection portion 67 detects the abnormality of the output signal of the steering angle sensor 29, the feedforward control portion 80 is enabled.

The feedback control portion 70 functions as a target steering angle computation portion 71, a deviation computation portion 72, a PID (Proportional Integral Differential) control portion 73, and a PWM (Pulse Width Modulation) signal generation portion 74. The target steering angle computation portion 71 computes the target steering angle based on the operation speed signal applied from the helm controller 16. Specifically, the target steering angle computation portion 71 computes the target steering angle by summing the operation speed signals. An initial value for the summation is the steering angle detected by the steering angle sensor 29. The deviation computation portion 72 computes the deviation of the steering angle (actual steering angle) detected by the steering angle sensor 29 from the target steering angle. The target steering angle to be used may be the target steering angle computed by the target steering angle computation portion 71, or may be the target steering angle included in the steering angle command applied from the remote control ECU 51. The PID control portion 73 performs a proportional integral differential operation on the deviation computed by the deviation computation portion 72 to generate a control value to reduce the deviation. The PWM signal generation portion 74 generates a PWM signal having a duty ratio according to the control value. The drive circuit 66 is driven based on the PWM signal generated by the PWM signal generation portion 74.

The drive circuit 66 includes an H-type bridge circuit connected to the battery 15 (also see FIG. 2) which is charged by the power generator 30 provided in the outboard motor OM. More specifically, the drive circuit 66 includes two series circuits each including an upper arm switching element U1, U2 and a lower arm switching element L1, L2, and the two series circuits are connected in parallel to the battery 15. The switching elements U1, U2, L1, L2 are each typically a semiconductor switch such as a power transistor. Two terminals of the electric motor M are respectively connected to a node N1 located between a pair of switching elements U1 and L1 of a first series circuit and a node N2 located between a pair of switching elements U2 and L2 of a second series circuit. The electric motor M is, for example, a DC motor (direct current motor). The switching elements U1, U2, L1, L2 are switched by the PWM signal generated by the PWM signal generation portion 74 such that a voltage is applied to the electric motor M according to the duty ratio of the PWM signal.

When the electric motor M is driven in the forward rotation direction, for example, the lower arm switching element L1 of the first series circuit and the upper arm switching element U2 of the second series circuit are maintained in an OFF state. Then, the upper arm switching element U1 of the first series circuit and the lower arm switching element L2 of the second series circuit are turned on and off by the PWM signal. When the electric motor M is driven in the reverse rotation direction, the upper arm switching element U1 of the first series circuit and the lower arm switching element L2 of the second series circuit are maintained in an OFF state. Then, the lower arm switching element L1 of the first series circuit and the upper arm switching element U2 of the second series circuit are turned on and off by the PWM signal.

Thus, the drive circuit 66 is driven by the PWM signal having the duty ratio according to the deviation (steering angle deviation) of the actual steering angle from the target steering angle such that the voltage is applied to the electric motor M to reduce the steering angle deviation. Thus, the steering angle of the outboard motor OM is adjusted to the target steering angle. That is, the steering actuator 25 is feedback-controlled so that the actual steering angle detected by the steering angle sensor 29 approaches the target steering angle.

The feedforward control portion 80 controls the steering actuator 25 so as to change the steering angle according to the operation speed detected by the operation speed sensor 12. More specifically, the steering actuator 25 is controlled so as to achieve a steering angle change amount corresponding to the operation speed. The output signal of the steering angle sensor 29 is not used.

The feedforward control portion 80 includes a steering angle change amount computation portion 81 and a PWM signal generation portion 82. The steering angle change amount computation portion 81 computes the steering angle change amount corresponding to the operation speed detected by the operation speed sensor 12. The steering angle change amount computation portion 81 may compute the steering angle change amount, for example, by the PID (Proportional Integral Differential) operation. The PWM signal generation portion 82 generates a PWM signal having a duty ratio corresponding to the steering angle change amount computed by the steering angle change amount computation portion 81. The drive circuit 66 is driven by the PWM signal generated by the PWM signal generation portion 82. The configuration and the operation of the drive circuit 66 are described above. Therefore, by thus driving the drive circuit 66 by the PWM signal having the duty ratio corresponding to the operation speed, the voltage is applied to the electric motor M according to the operation speed of the steering wheel such that the outboard motor OM can be steered according to the operation of the steering wheel 6. That is, the steering actuator 25 (electric motor M) is feedforward-controlled without the use of the output signal of the steering angle sensor 29.

An electric current sensor 68 (electric current detection circuit) is provided which detects an electric current (motor current) supplied from the drive circuit 66 to the electric motor M. The output signal of the electric current sensor 68 is inputted to the processing unit 65. The processing unit 65 can detect the motor current based on the output signal of the electric current sensor 68. The processing unit 65 may monitor the motor current and, as required, restrict the duty ratio of the PWM signal to restrict the voltage to be applied to the electric motor M.

FIG. 5 is a flowchart for describing an exemplary process to be performed by the steering controller 22.

The steering controller 22 performs an abnormality detecting process to monitor the output signal of the steering angle sensor 29 for an abnormality (Step S1, the function of the abnormality detection portion 67).

If the output signal of the steering angle sensor 29 is not abnormal (NO in Step S2), the steering controller 22 enables the feedback control portion 70 (disables the feedforward control portion 80) to be switched into the feedback mode (Step S3). Therefore, the steering controller 22 feedback-controls the steering actuator 25 based on the output signal of the steering angle sensor 29 so as to achieve the target steering angle.

During the feedback control, the steering controller 22 computes the target steering angle corresponding to the operation of the steering wheel 6 by summing the operation speeds applied from the helm controller 16. When the steering angle command (including the target steering angle) is applied from the remote control ECU 51, the steering controller 22 may stop the computation of the target steering angle.

Further, the steering controller 22 determines whether or not the target steering angle has a value corresponding to either of the steering limits (Step S4). If the target steering angle is the steering limit value (YES in Step S4), the steering controller 22 outputs the helm lock command to the helm controller 16 (Step S5). Thus, the helm controller 16 actuates the brake 13 to restrict the rotation of the steering wheel 6. If the target steering angle is not the steering limit value (NO in Step S4), Step S5 is skipped. In the determination in Step S4, the actual steering angle detected by the steering angle sensor 29 may be used instead of the target steering angle.

If the output signal of the steering angle sensor 29 is abnormal (YES in Step S2), on the other hand, the steering controller 22 enables the feedforward control portion 80 (disables the feedback control portion 70) to be switched into the feedforward mode (Step S6). Therefore, the steering controller 22 feedforward-controls the steering actuator 25 based on the output signal of the operation speed sensor 12. In this case, the steering controller 22 does not compute the target steering angle by the summation of operation speeds.

When the abnormality of the output signal of the steering angle sensor 29 is detected, the steering controller 22 provides the abnormality occurrence information to the helm controller 16 and the remote control ECU 51 via the outboard motor control network 56 (Step S7). This information is also transmitted to the gauge 9 and the main controller 50. The abnormality occurrence information is displayed on the gauge 9 such that the user is informed of the occurrence of the abnormality.

Upon reception of the abnormality occurrence information, the main controller 50 switches its control mode to the ordinary watercraft maneuvering mode. That is, when the abnormality occurrence information is received in a control mode other than the ordinary watercraft maneuvering mode (the joystick mode, the automatic watercraft maneuvering mode, or the like), the control mode is switched to the ordinary watercraft maneuvering mode. When the abnormality occurrence information is received in the ordinary watercraft maneuvering mode, the ordinary watercraft maneuvering mode is maintained.

If the information about the abnormality of the output signal of the steering angle sensor 29 is not provided, the helm controller 16 controls the brake 13 based on the steering angle information (e.g., the helm lock command) applied from the steering controller 22. That is, when the steering angle of the steering device STG (the target steering angle or the actual steering angle) corresponds to either of the steering limits, the helm controller 16 actuates the brake 13 to restrict the rotation of the steering wheel 6. The helm controller 16 stops controlling the brake 13 when being informed of the abnormality of the output signal of the steering angle sensor 29. That is, the helm controller 16 does not actuate the brake 13, but permits the limitless rotation of the steering wheel 6.

The helm controller 16 controls the brake 13 based on the steering angle information (e.g., the helm lock command) applied from the steering controller 22. Without the supply of the steering angle information due to the occurrence of the abnormality, therefore, the brake 13 is not actuated. Accordingly, the stop of the control of the brake 13 based on the information about the abnormality of the steering angle sensor 29 may be obviated.

In an example embodiment, the steering controller 22 thus monitors the output signal of the steering angle sensor 29 for an abnormality. If no abnormality is detected, the steering controller 22 feedback-controls the steering actuator 25 (more specifically, the electric motor M) based on the output signal of the steering angle sensor 29 so as to achieve the target steering angle. When the abnormality is detected, the steering controller 22 feedforward-controls the steering actuator 25 (more specifically, the electric motor M) based on the operation speed of the steering wheel 6 detected by the operation speed sensor 12. Thus, the steering function based on the operation of the steering wheel 6 can be maintained even when the abnormality occurs in the output signal of the steering angle sensor 29.

The manual operation mechanism for the manual steering of the outboard motor OM for an emergency requires a greater effort as compared with the steering operation based on the operation of the steering wheel 6. Therefore, even when the abnormality occurs in the output signal of the steering angle sensor 29, the steering function based on the operation of the steering wheel 6 can be maintained such that the user's effort can be significantly alleviated.

When the abnormality occurs in the output signal of the steering angle sensor 29 in the joystick mode or the automatic watercraft maneuvering mode, the steering controller 22 is switched to the feedforward mode, and the main controller 50 is automatically switched to the ordinary watercraft maneuvering mode upon the reception of the information from the steering controller 22. Thus, the watercraft maneuvering operation based on the operation of the steering wheel 6 can be smoothly started. Further, the main controller 50 can properly switch the control mode, and can properly generate the target steering angle and properly stop the generation of the target steering angle.

When the abnormality occurs in the output signal of the steering angle sensor 29, the control of the brake 13 for the restriction of the rotation of the steering wheel 6 is disabled, and the limitless rotation of the steering wheel 6 is permitted. Thus, the steering wheel 6 can be maintained in the operable state, so that the steering function based on the operation of the steering wheel 6 can be maintained.

While example embodiments of the present invention have thus been described, the present invention may be embodied in some other ways as will be described below by way of example.

In the example embodiments described above, the watercraft 1 is configured such that the single outboard motor OM is attached to the hull 2 by way of example, but the example embodiments described above may be applied to a watercraft configured such that two or more outboard motors are attached to the hull 2.

In the example embodiments described above, a propulsion device other than the outboard motor may be used. Specifically, the example embodiments described above may be applied to a watercraft including an inboard motor, an inboard/outboard motor, a waterjet propulsion device, or other type of propulsion device.

The prime mover for the propulsion device is not necessarily required to be the engine, but may be an electric motor.

The steering angle is not necessarily required to be the steering angle of the outboard motor, but may be the angle of a rudder plate.

The joystick may be used instead of the steering wheel as the steering operator.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft maneuvering system comprising:
   a steering operator to be operated by a user to steer a watercraft;
   an operation amount sensor to detect an operation amount of the steering operator;
   a steering device including a steering actuator to change a steering angle;
   a steering angle sensor to detect the steering angle; and
   a steering controller configured or programmed to control the steering actuator according to an output signal of the operation amount sensor and an output signal of the steering angle sensor; wherein
   the steering controller is configured or programmed to:
      monitor the output signal of the steering angle sensor for an abnormality;
      feedback-control the steering actuator based on the output signal of the steering angle sensor to achieve a target steering angle when the abnormality is not detected; and
      feedforward-control the steering actuator based on the output signal of the operation amount sensor when the abnormality is detected.

2. The watercraft maneuvering system according to claim 1, wherein the operation amount sensor is operable to detect an operation speed of the steering operator.

3. The watercraft maneuvering system according to claim 1, wherein the steering controller is configured or programmed to compute the target steering angle based on the output signal of the steering angle sensor and the output signal of the operation amount sensor, and to stop computing the target steering angle when the abnormality is detected.

4. The watercraft maneuvering system according to claim 1, wherein the steering operator includes a steering wheel with no operation range limit.

5. The watercraft maneuvering system according to claim 4, further comprising:
   a rotation restrictor to restrict rotation of the steering wheel; and
   a helm controller configured or programmed to control the rotation restrictor; wherein
   the steering controller is configured or programmed to transmit steering angle information about the steering angle of the steering device to the helm controller when the abnormality does not occur; and
   the helm controller is configured or programmed to actuate the rotation restrictor to restrict the rotation of the steering wheel when the steering angle of the steering device corresponds to a steering limit indicated by the steering angle information.

6. The watercraft maneuvering system according to claim 5, wherein the helm controller is configured or programmed not to actuate the rotation restrictor but to permit limitless rotation of the steering wheel when the abnormality occurs.

7. The watercraft maneuvering system according to claim 4, further comprising:
a main controller configured or programmed to generate the target steering angle and supply the target steering angle to the steering controller in a watercraft maneuvering mode which is not based on the operation of the steering wheel; wherein
the main controller is configured or programmed to switch to an ordinary watercraft maneuvering mode based on the operation of the steering wheel upon reception of information about the abnormality from the steering controller, and stop the generating the target steering angle.

8. The watercraft maneuvering system according to claim 7, wherein the ordinary watercraft maneuvering mode includes at least one of an automatic watercraft maneuvering mode or a joystick mode in which the main controller generates the target steering angle in response to the operation of a joystick.

9. The watercraft maneuvering system according to claim 1, wherein the steering controller is configured or programmed to control the steering actuator to change the steering angle of the steering device according to the operation amount detected by the operation amount sensor in the feedforward-control.

10. The watercraft maneuvering system according to claim 1, wherein the steering actuator includes a hydraulic actuator including a hydraulic cylinder and an electric pump to supply a hydraulic oil to the hydraulic cylinder.

11. The watercraft maneuvering system according to claim 1, wherein the steering device steers an outboard motor attached to a hull.

12. A watercraft maneuvering system comprising:
a steering operator to be operated by a user to steer a watercraft;
an operation amount sensor to detect an operation amount of the steering operator;
a steering device including a steering actuator to change a steering angle;
a steering angle sensor to detect the steering angle; and
a steering controller configured or programmed to control the steering actuator according to an output signal of the operation amount sensor and an output signal of the steering angle sensor; wherein
the steering controller is configured or programmed to include a feedback mode in which the steering actuator is feedback-controlled to achieve a target steering angle based on the output signal of the steering angle sensor, and a feedforward mode in which the steering actuator is feedforward-controlled based on the output signal of the operation amount sensor.

13. A watercraft comprising:
a hull; and
the watercraft maneuvering system according to claim 1 provided on the hull.

14. A watercraft comprising:
a hull; and
the watercraft maneuvering system according to claim 12 provided on the hull.

* * * * *